(12) United States Patent
Eidenvall et al.

(10) Patent No.: US 6,504,364 B1
(45) Date of Patent: Jan. 7, 2003

(54) METHOD AND APPARATUS FOR IMPROVED ELECTOMAGNETIC MEASUREMENT OF METALLIC MATERIAL

(75) Inventors: Anders Eidenvall, Vasteras (SE); Martin Sehlstedt, Lulea (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/763,876

(22) PCT Filed: Sep. 1, 1999

(86) PCT No.: PCT/SE99/01508

§ 371 (c)(1),
(2), (4) Date: May 2, 2001

(87) PCT Pub. No.: WO00/13045

PCT Pub. Date: Mar. 9, 2000

(30) Foreign Application Priority Data

Sep. 1, 1998 (SE) .............................................. 9802935

(51) Int. Cl.[7] .............................................. G01N 27/72
(52) U.S. Cl. ...................................... 324/239; 324/326
(58) Field of Search ................................ 324/239, 233, 324/326, 329, 207–217, 327, 328; 209/562, 567

(56) References Cited

U.S. PATENT DOCUMENTS

| 4,475,083 A | * | 10/1984 | Linder | 324/227 |
| 4,613,815 A | * | 9/1986 | Christel, Jr. | 324/233 |
| 4,868,499 A | * | 9/1989 | Walker | 324/225 |

OTHER PUBLICATIONS

Abstract—Japan No. 8–86773A, Apr. 2, 1996; Kandenko Co. Ltd., Akitsu Seiki KK Takasago.
Abstract—Japan No. 59–60274 A; Apr. 6, 1984; Anritsu Denki K.K.

* cited by examiner

*Primary Examiner*—Edward Lefkowitz
*Assistant Examiner*—Subhash A Zaveri
(74) *Attorney, Agent, or Firm*—Dykema Gossett, PLLC

(57) ABSTRACT

A device for carrying out measurements of a quantity through measuring the influence upon a magnetic field generated through a basic signal in a region of measurement (16) has a first member (7) adapted to change the polarity of the basic signal in a regular way on the basis of the length of the time for regularly repeating the basic signal, or a multiple thereof, and a second member (9) adapted to change the polarity of a detection signal in connection with the treatment of this detection signal synchronizedly with the polarity change of the first member.

17 Claims, 3 Drawing Sheets

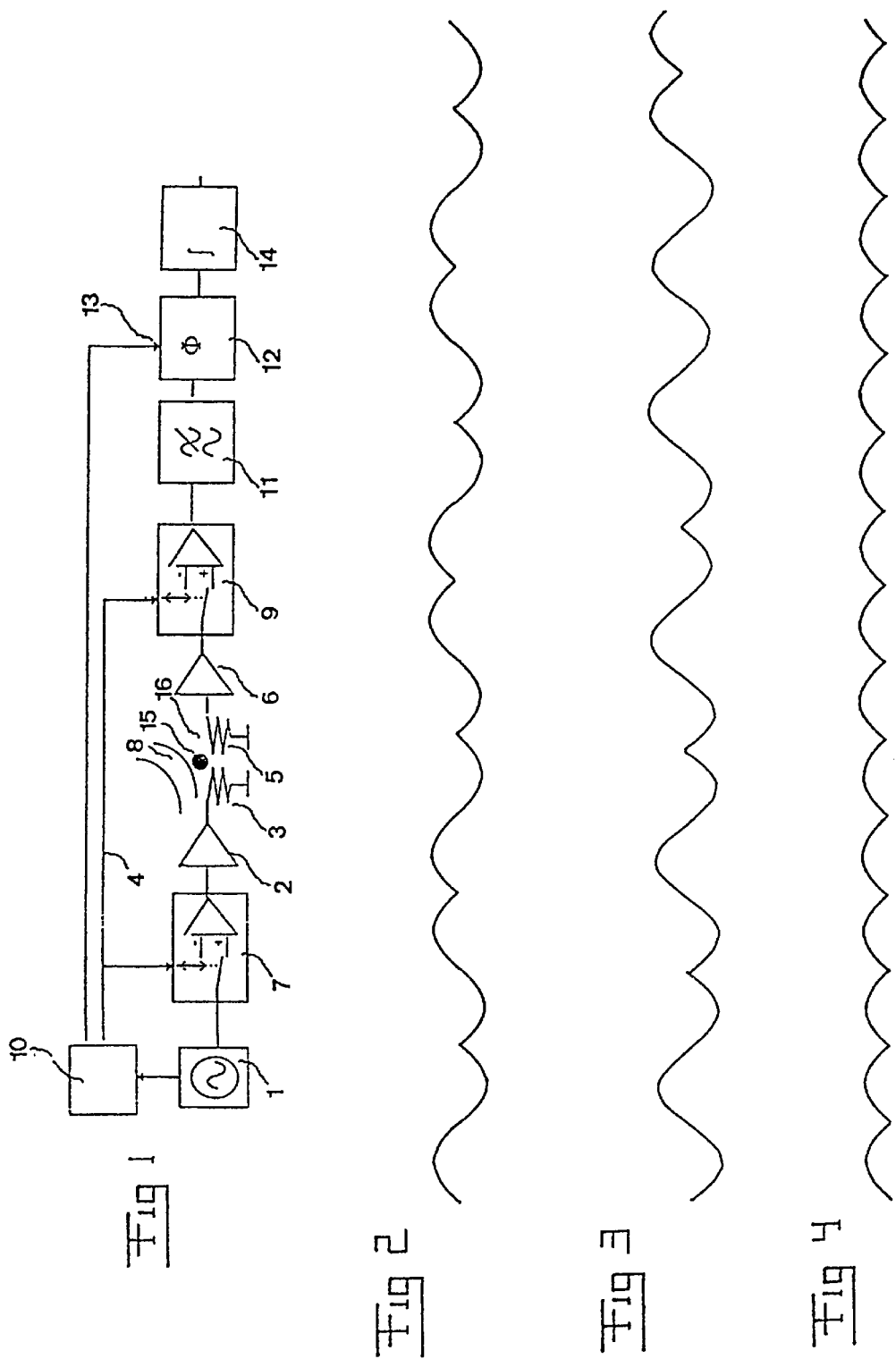

METHOD AND APPARATUS FOR IMPROVED ELECTOMAGNETIC MEASUREMENT OF METALLIC MATERIAL

FIELD OF THE INVENTION

The present invention relates to a method and a device according to the preambles of the appended independent method and device claims, which aim at reducing the influence of exterior disturbing magnetic fields upon the measurement of quantities through inductive measurement technique.

The invention may be used for finding metal objects, as nails and other metal objects in logs or metal ribbons in paper handling. The invention may also be used for inductive measurement of quantities of metal products, such as thickness of plate ribbons or the diameter of rods or other geometric measure of metal products. The invention may also be useful for measuring electric and magnetic properties of metal products.

PRIOR ART

To detect the presence of metal objects by means of inductive technique and to measure the size of metal objects by means of inductive technique has to be considered to be a technique known for a long time. A magnetic field varying with the time is then normally generated by feeding a coil with a current varying regularly with the time. The field so generated interacts with the metal object in the field region and induces currents in the object, which in their turn creates magnetic fields superposed on the field applied. The two fields, the applied one and the superposed from the object, are normally measured by a coil, a receiving coil, in which the two fields will induce a voltage which will be a primary measure of the quantity asked for. The generating coil and the receiving coil may be separate coils or the same coil and the transmitting as well as receiving coil may be one coil or an arrangement of coils.

The current varying regularly with the time feeding the generating coil is normally a sinusoidal current having a constant fre quency, such as described in U.S. Pat. No. 4,475,083, but it may also be a current having a rectangular wave shape with a constant time length, such as described in U.S. Pat. No. 5,227,902, or it may be of another shape being regular with respect to the time. The time for the regular repetition of the current is called the time length of the feeding current or of the measurement or as an alternative, the frequency by which the regularity is repeated is called the frequency of the feeding current or of the measurement.

The currents induced in the object and so the superposed field from the object, which through induced voltage in a receiving coil is measured as a measure of objects, will be totally controlled by the generating field. The consequence thereof is that the induced voltage in the receiving coil will have the same regularity with respect to the time as the current generating a field emanating from the basic signal. This is often a great advantage as it is on one hand known in which period of time the induced voltage from the object is received, on the other by that fact that it is possible to use the progress of the generated current with the time so as to control the analysis of the induced voltage. The fact first mentioned makes it possible to make filters for removing undesired noises having other periods of time with a high accuracy according to known filter technique. The fact last mentioned means that the signal may be treated very exactly for detecting the voltage superposed from objects selectively from the voltage caused by the applied field in the receiving coil, by synchronous rectifying, such as described in SE 7710481-8, or by analysis of determined periods of time, such as described in U.S. Pat. No. 5,059,902.

A problem when using the above measuring and detection technique in industrial connections is the fact that big electric machines close to such a meter produce strong magnetic fields varying with the time, which often may have a length of time, with a regular time progress, which is (nearly) the same as the length of time of the current applied. The consequence of this is that the outer disturbance may not be noticeably suppressed by the technique known so far.

A way to reduce the outer disturbance in an inductive meter is to build it in in any type of shield, but this is often impossible in industrial applications, since this requires a large space often not available. Furthermore, such a meter has to have large openings for introducing and taking out material to be measured and disturbing fields may enter through these openings.

The problems with an influence of outer disturbing fields will be solved by using the frequency modulation technique known from the telecommunication technique, i.e. to continuously and in a controlled way change the length of time. However, this way to proceed means that a larger number of regular time progresses have to be treated for eliminating the disturbance, which in its turn means that the measurement often gets too slow for the need of fastness existing. As an example the industrial search for nail in logs may be mentioned, in which a possible nail may manage to pass the meter during these time progresses. Furthermore, the use of the modulation technique mentioned above means that filter constructed with a narrow band may not be used to the same extent, which produces a positive effect of the modulation.

SUMMARY OF THE INVENTION

The object of the present invention is to provide a method and a device for inductive measurement of a quantity, which makes it possible to substantially reduce the negative influence of exterior disturbance fields varying regularly with the time mentioned above having a time length of the regularity being close to the time length used in the measurement.

This object is according to the invention obtained by that the polarity of the basic signal sent to the coil is changed regularly and synchronized with the length of time for the regular repetition of the basic signal, so that the coil is brought to generate a magnetic field on the basis of the basic signal so modified, an analysis of the detection signal induced in the region of measurement is controlled in synchronisation with this change of polarity, and a polarity change of the detection signal is carried out in synchronisation with the polarity change of the basic signal before this analysis, in which polarity change means that the signal in question thereafter takes an opposite sign to the sign it would have had without such a change until a subsequent such change, after which it gets the same appearance as had none of the two last polarity changes taken place. This polarity change may either take place with the length of the time of regular repetition of the basic signal, i.e. the time length, or any exact multiple thereof and gives a regular determined pattern. A device according to the invention has a first member adapted to change the polarity of the basic signal sent to the coil in a regular way on the basis of a length of the time of a regular repetition of the basic signal or a multiple thereof, and a second member adapted to change the polarity of the detection signal synchronized with the polarity change by the first member in connection with the treatment of the detection signal, in which polarity change means that the signal in question thereafter takes an opposite sign to the sign it would have had without such a change until a subsequent such change, after which it gets the same appearance as had none of the two last polarity changes taken place, so that disturbing signals with a length of time close to the length of time of said basic signal will be eliminated if the detection signal is summarized over a measurement time period extending at least over the period of time between said regular changes of polarity of the detection signal.

By ensuring that the components of the detection signal emanating from the basic signal are influenced twice in this way, but the components emanating from the disturbance signal are only influenced once it will be possible to make the influence through said second member so that said addition will substantially give a zero signal with respect to the disturbance signals, without causing the very measuring signal, i.e. the basic signal possibly influenced in the region of measurement, to disappear by the integration of the signal, but the information about this quantity remains and may be determined with a high reliability.

According to a preferred embodiment of the invention said first and second members for signal influence are coordinated in such a way that the second member influences the detection signal to change polarity inversely to the influence by the first member upon the basic signal, so that components included in the detection signal subjected to an influence of the first as well as the second member will have substantially the same appearance as had they not been subjected to any influence at all. This constitutes a very simple and advantageous solution to the problem to ensure that the integration over the measurement time period of components of the detection signal emanating from disturbing signals will be substantially zero at the same time as components thereof emanating from the basic signal and possible influence thereupon through the measurement in the region of measurement give a well-measurable result, since in this case the components last mentioned will remain substantially uninfluenced by the first and second members. However, it is pointed out that it is within the scope of the invention to carry out different signal influence by the first and second members, as long as it is obtained by the signal influence through the first members that the very measurement signal through influence by the second members will not receive such an appearance that it will be substantially zero when carrying out said addition, but will continuously be well interpretable.

According to another preferred embodiment of the invention the member for generating the basic signal is in a first case adapted to continuously vary the time length of the basic signal, i.e. the length of the time for the regular repetition of the basic signal, and in a second case to continuously vary the frequency of the basic signal. The polarity change of the basic signal and the synchronously controlled change of the detection signal as above may be combined with the change of the time length or alternatively the frequency of the basic signal progress over time. Especially in measuring situations where disturbances are large and contain different time length components, or alternatively frequency components, in which any of these components has substantially the same time length as the basic signal, such a combination may give an efficient disturbance elimination. The time length of the basic signal may then as for frequency modulation be continuously varied around a midvalue and the polarity of the basic signal of the detection signal is at the same time turned as above.

Further advantages as well as advantageous features of the invention will appear from the following description and the other dependent claims.

BRIEF DESCRIPTION OF THE DRAWINGS

With reference to the appended drawings, below follows a description of preferred embodiments of the invention cited as examples.

In the drawings:

FIG. 1 is a principle sketch of the device according to a preferred embodiment of the invention, FIGS. 2 and 3 show the appearance of components of the detection signal emanating from sinusoidal disturbance signals after influence of said second member of devices according to two different preferred embodiments of the invention, FIG. 4 shows what the detection signal may look like after synchronized rectifying of the device according to the invention.

DETAILED DESCRIPTION OF PREFERRED EMBODIMENTS OF THE INVENTION

Figure 6:
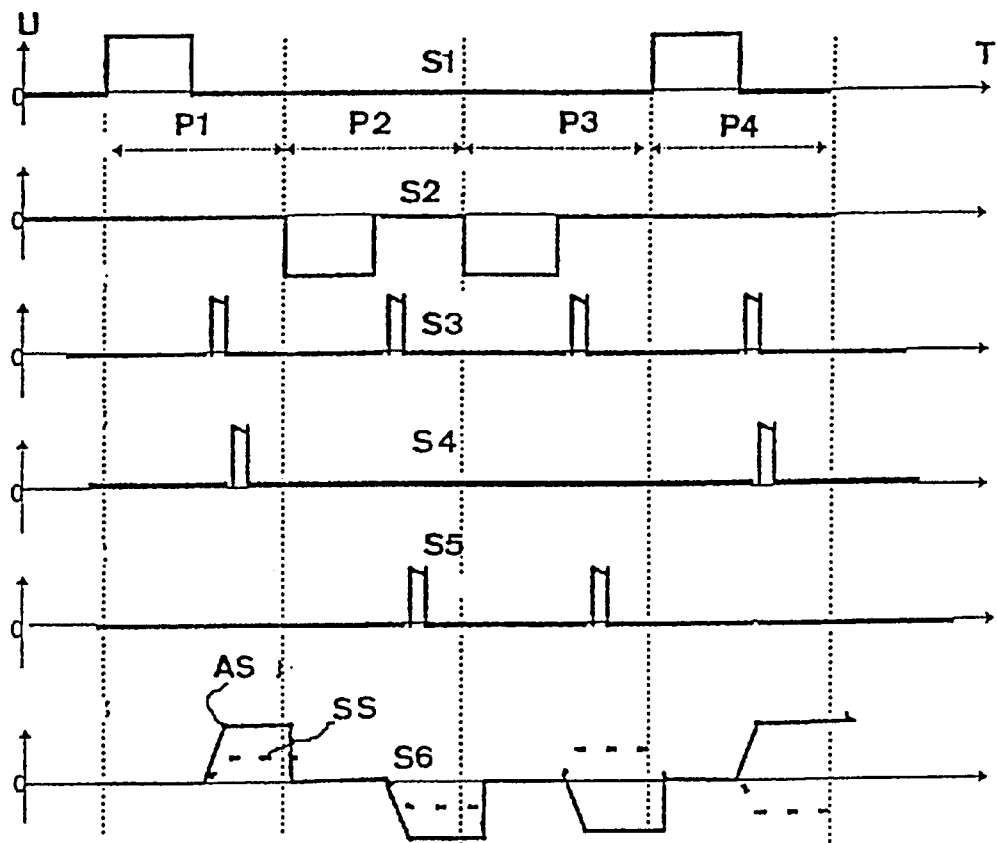
FIG. 6 shows an example of control signals and signal components for a device according to FIG. 5.

The general construction of a device according to a preferred embodiment of the invention for carrying out measurements of quantity of an object 15 through measuring the influence upon a magnetic field in the region of measurement is very schematically illustrated in FIG. 1, in which it will in the following be discussed how the existence of a small metal object in the region of measurement may be detected. The device comprises a member 1 for generating a so called basic signal varying with the time and having a constant time length, in this case exemplified by a sinusoidal signal of a constant time length, or frequency. This signal is intended to control a transmitter coil 3 after amplification in an amplifier 2 for generating a magnetic field according to this signal in the region of measurement. The receiver coil 5 is adapted to detect said magnetic field in the measuring region 16 and generate a detection signal amplified through an additional amplifier 6 and then sent further for determining whether a metal object has existed and thereby influenced the magnetic field in the region of measurement 16 or not.

In the path of the basic signal from the member 1 generating the signal before the coil 3 a first member 7 is arranged to influence the character of the basic signal, more exactly by shifting the polarity thereof with regular time intervals unambiguously determined by the time length of the basic signal, which is defined as the repetition time of the basic signal or as an alternative the frequency thereof. In a preferred embodiment the polarity is shifted once each time length, which is also shown in FIG. 2. The member 7 may be an operation amplifier having a negative and a positive input and with the gain 1, in which each input is connected to a switch alternatingly conducting the signal to the respective input, so that when the signal comes in on the positive input it will pass the amplifier uninfluence and when the signal comes in on the negative input the polarity thereof will be inversed.

The joint control to the members 7 and 9 indicated in FIG. 1 may also be two separate controls having different time progresses but nevertheless synchronized to each other. If for instance a time delay is present between the basic signal and the detection signal the time control of the members 7 and 9 may have to consider this time delay.

It is indicated in FIG. 1 by wave fronts 8 that disturbance signals, more exactly disturbance signals having a time length close to the one of the basic field, reach the region of measurement 16 and will influence the detection signal. The disturbance signal may be such a signal usually existing in industrial environment and which may derive from driving arrangements for engines driven by frequency converters. An influence of the signal in the member 7 is carried out on the generating basic signal alone without disturbance signals included therein, while said detection signal, which also has components from said disturbance signal, reaches a second member 9, which is adapted to influence the character of the detection signal, more exactly this member is adapted to expose the detection signal to the same influence as the first member 7 used for the basic signal. This influence is controlled through a joint member indicated at 10, which in its turn uses the basic signal for achieving the control desired. The function of this device is explained in connection with FIG. 2.

The device comprises also a filter 11 adapted to filter out signals having frequencies being clearly different from the frequency of the basic signal. As a consequence of the fact that the time length or the frequency of the basic. signal is not changed at polarity changes, this filter may be constructed with a maximum narrow band and nevertheless let said detection signal completely through but stopping signals having a time length comparatively close thereto. The detection signal resulting thereafter is sent on to a member 12 adapted to synchronously rectify the detection signal on the basis of the basic signal, which it receives on an input 13, more exactly by multiplying the signal arriving thereto by plus 1 when the sinusoidal basic signal is positive and by minus 1 when the sinusoidal basic signal is negative. The component of the detection signal emanating from this sinusoidal basic signal, which may be influenced by the metal detection, will hereby receive the appearance shown in FIG. 4, since it will be multiplied by plus 1 when it is positive and by minus 1 when it is negative. The amplitude of this signal depends upon the existence of metal objects in the region of measurement 16.

The member 12 may also be designed in other known ways for synchronized rectifying than the way described above.

The components of the detection signal emanating from the disturbance signal will however sometimes co-operate with and sometimes counteract the sinusoidal basic signal and at the multiplication in the member 12 during a predetermined measurement time period get at positive part being just as large as the negative part.

The device also comprises means 14 for integrating the measurement signal from the member 12 over a measurement time period referred to having a length corresponding to at least the time it takes for a regular change of polarity of the basic signal. This measurement time period is more exactly so selected that the components of the measurement signal emanating from the sinusoidal disturbance signal will substantially disappear at this integration, so that only the signal shown in FIG. 4 will be a part of the result of the integration and thereby said disturbing signals will not have any noticeable influence upon the measurement result, so that the appearance thereof is determined by the existence of metal objects in the region of measurement and these may thereby be detected with a high reliability. This means that the length of the measurement time period and of the influence of the second member may be carefully co-ordinated with each other for eliminating the contribution of the sinusoidal disturbances in the integration.

Another possibility to signal influence is shown in FIG. 3, in which this shall take place in the first and second member at a time length corresponding to one and a half time length of the basic signal. A disturbing signal having a time length being the same as for the basic signal is eliminated by polarity change in this way over a measurement time of 3 time lengths at the same time as the measurement signal remains uninfluenced. An additional advantage resulting from the polarity change according to FIG. 3 is that the disturbing influence from a simultaneous disturbance of 3 time lengths is eliminated.

Figure 5:
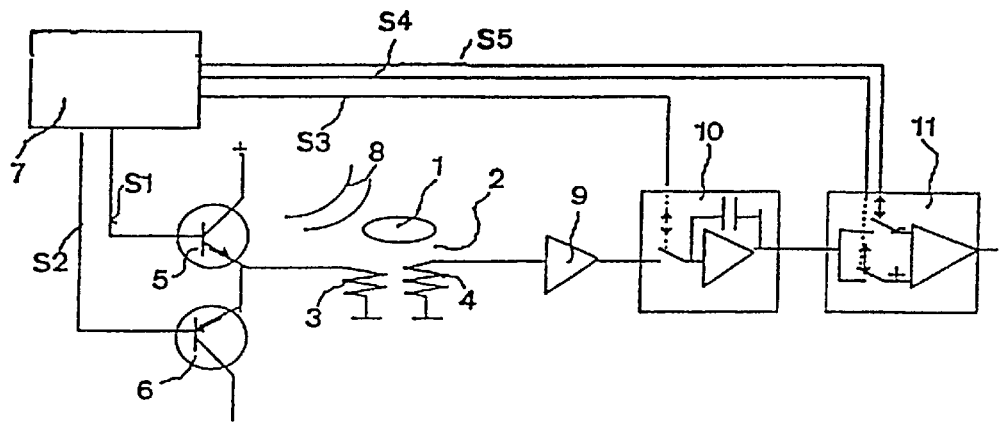
FIG. 5 shows a principle sketch of a device according to the invention for use in elimination of disturbances at industrial measurement by the use of feeding with a constant current supply and a sudden interruption.

A non-limitative way to use the invention in connection with the inductive measurement technique described in U.S. Pat. No. 5,059,902 is shown in FIG. 5. In an embodiment of this technique a transmitting coil 3 is fed with a constant current during a determined period of time, whereupon this current supply is suddenly interrupted, whereupon the induced voltage in a receiving coil 4 is analysed during different time intervals through integration of the voltage over this time interval. This integral is then a measure of a quantity of an object 1 being a conductor of electricity in the magnetic field area 2. Also in this type of measurement a disturbing field 8 having a frequency close to the repetition frequency of the device may have a disturbing influence. A device for such a measurement utilizing the invention is schematically shown in FIG. 5, and the control signals used by the device according to FIG. 5 for obtaining a desired disturbance elimination according to the invention are shown in FIG. 6.

The constant current supply of the transmitting coil 3 is adapted so that it may take place alternatingly in different directions, so that the magnetic field formed in the region of measurement gets different directions by using a transistor 5 positively fed and a transistor 6 negatively fed controlled from a control circuit 10 in accordance with S1 and S2, respectively, in FIG. 6. The control may be arranged from a computer or from TTL-logic or otherwise. First there will be a period 1, during which the transistor positively fed feeds the transmitting coil during the first half of this period, whereupon both transistors are turned off during the second half of the period 1 (P1), then a period 2 (P2) during which the transistor negatively fed feeds the transmitting coil during the first half, whereupon both transistors are turned off during the second half.

The period P2 described above is according to the invention now followed by a period P3, which with respect to the supply is a repetition of the period P2 instead of symmetrically change the polarity. The period P4 being a repetition of the period P1 is then according to the invention following thereupon. Accordingly, the period P3 and the period P4 are a repetition of the period P1 and the period P2 but with the polarity inverted.

The signal from the receiving coil 4, which has been influenced by the object as well as a possible disturbance 8, is amplified in an amplifier 9 and led to an integrator 10 open for integration with a control signal S3 from the control circuit a regular time after the interruption of the supply and is put to zero during the supply period. The signal out from the integrator will have a principle appearance shown by S6 in FIG. 6, depending upon the direction of the field fed. A disturbance having a time length being the same or close to the time between two supplies will alternatively make a positive and a negative contribution, while the signal emanating from the generating field will make a positive-negative-negative-positive contribution. A bipolar amplifier 11 switches upon positive and negative input, respectively, and is controlled by the control signals S4 and S5, respectively, so that the signal from the integrator will be uninfluenced with respect to the polarity when S4 is active and inversed with respect to the polarity when S5 is active. The sum over the four periods of the signal in question will get a value from which a quantity of the object may be measured, but the sum from the disturbance signal will get the value zero. AS and SS indicate an intended signal and a disturbance signal, respectively, while U and T indicate voltage and time, respectively.

The regularity of the polarity changes described in connection with the figures above with an alternatingly uninfluenced polarity—alternatingly changed polarity, is not in any way restricting for the invention. The choice of the design of a regular polarity change is instead determined by the appearance of the disturbance and the desires of eliminating the influence of exterior disturbances as far as possible. Should the exterior disturbance primarily contain a component having a frequency and a time length being the same as or almost the same as the frequency or the time of the current generated, the above way of changing polarity is often an optimum, but should the exterior disturbance have a basic frequency being substantially lower than the generating current but have many harmonics, of which some has a frequency close to the generating current, a regular polarity change schedule in accordance with FIG. 7 may be advantageous. Such a schedule has a substantially better ability than the ones described above also to eliminate disturbances on frequencies differing from the generating frequency.

Figure 7:
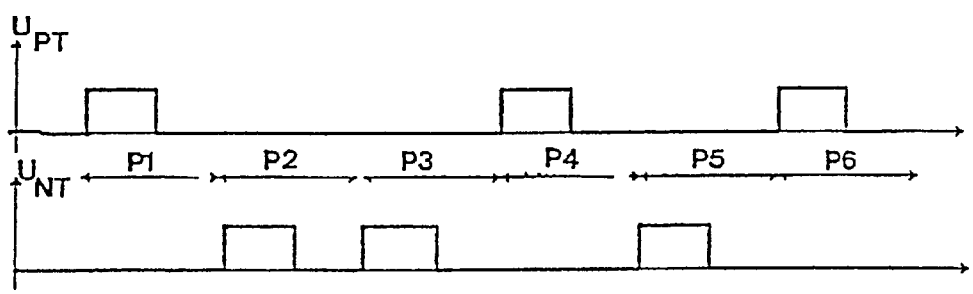
FIG. 7 shows a second example of control signals and signal components for a device according to FIG. 5.

In the control voltage time diagram in FIG. 7 the period P1 and the period P2 are considered as a time length of uninfluenced polarity, the period P3 and P4 as a period of an inversed polarity, and the period P5 and the period P6 again as a period of an inversed polarity. The detecting member 10 according to FIG. 5 is influenced in the corresponding way and an integration of the received signal takes place over the entire time lengths from the period P1 to the period P6. A substantial elimination also of other disturbing frequencies than those corresponding to the time length of the period P1 and the period P2 is then achieved. $U_{PT}$ and $U_{NT}$ indicate control voltage positive transistor and control voltage negative transistor, respectively. Regular time sequences for changing polarity for elimination of disturbing frequencies according to the invention may be constructed for an optimum elimination of exterior disturbance would the frequency spectrums of different time length components of the disturbance be known. It is then easy for a man with skill in the art to design an optimum schedule for the polarity change on the basis of the invention. This is valid independently of the type of current supply varying regularly used, such as sinusoidal, rectangular wave or other shape.

The invention is of course not in any way restricted to the preferred embodiments described above, which clearly appears from the discussion above, but many possibilities to modifications thereof will be apparent for a man with ordinary skill in the art without departing from the basic idea of the invention.

Thus, it appears from the description above that "synchronized" in the claims is not to be interpreted as if the polarity changes of the detection signal take place simultaneously as those of the basic signal or even at the same time interval as for the latter, but the polarity changes of the two signals take place according to a time connection.

Furthermore, it appears from the description above how the patent claim definition "disturbing signals having a time length close to the time length of said basic signals" is to be interpreted, since it from the discussion on page 12, first paragraph of this disclosure appears that the disturbing signals eliminated by the way to proceed according to the invention may have a time length differing to some extent from the time length of the basic signal.

It should be observed that different parts included in the device do not at all have to be components physically separated, and the member generating the basic signal may for example be the same as the one changing the polarity thereof. The polarity change and the analysis may also be integrated into one and the same member. The claims are to be interpreted to cover this.

What is claimed is:

1. A method for carrying out measurements of a quantity by measuring an influence upon a magnetic field in a region of measurement in which a basic signal varying regularly with the time is generated and sent to a coil in the region of measurement for generating a magnetic field in accordance therewith, the magnetic field of the coil is detected in the region of measurement through generating a detection signal and a possible component deriving from an influence upon the magnetic field in the region of measurement associated with said quantity is separated from this detection signal for determining said quantity, wherein the polarity of the basic signal sent to the coil is changed regularly and synchronized with the length of time for a regular repetition of the basic signal, so that the coil is brought to generate a magnetic field on the basis of the basic signal so modified, an analysis of the detection signal induced in the region of measurement is controlled in synchronization with this change of polarity, and that a polarity change of the detection sign is carried out in synchronization with the polarity change of the basic signal before this analysis, in which polarity change means that the signal in question thereafter takes an opposite sign to the sign it would have had without such a change until a subsequent such change, after which it gets the same appearance as had none of the two last polarity changes taken place.

2. A method according to claim 1, wherein the time length of the basic signal, i.e., the length of the time for a regular repetition of the basic signal, is continuously varied over the time.

3. A method according to claim 1 wherein the frequency of the basic signal is varied continuously.

4. A method according to claim 1, wherein the detection signal is influenced by polarity change inversely to the influence of the basic signal, so that components of the detection signal subjected to both these influences will have substantially the same appearance as had they not been subjected to any influence at all.

5. A method according to claim 1, wherein said polarity change is carried out several times within the measurement period of time of the analysis.

6. A device for carrying out measurement of a quantity by measuring an influence upon a magnetic field in a region of measurement which comprises members adapted to generate a basic signal varying regularly with the time for controlling a coil to generate a magnetic field in accordance therewith in the region of measurement and members adapted to detect the magnetic field of the coil in region of measurement and send a detection signal to an arrangement adapted to separate a possible component emanating from an influence upon the magnetic field in the region of measurement associated with said quantity from this signal for determining this quantity, wherein the device has a first member adapted to change the polarity of the basic signal sent to the coil in a regular way on the basis of the length of the time of a regular repetition of the basic signal or multiple thereof, and a second member adapted to change the polarity of the detection signal synchronized with the polarity change by the first member in connection with the treatment of the detection signal, in which polarity change means that the signal in question thereafter takes an opposite sign to the sign it would have had without such a change until a subsequent such change, after which it gets the same appearance as had none of the two last polarity changes taken place, so that disturbing signals with a length of time close to the length of time of said basic signal will be eliminated if the detection signal is summarized over the measurement time period extending at least over the period of time between said regular changes of polarity of the detection signal.

7. A device according to claim 6, wherein said first and second member for signal influence are co-ordinated in such a way that the second member influences the detection signal to change polarity inversely to the influence by the first member upon the basic signal, so that components included in the detection signal subjected to an influence of the first as well as the second member will have substantially the same appearance so had they not been subjected to any influence at all.

8. A device according to claim 6, the second members are adapted to change polarity of the detection signal several times within the measurement time period.

9. A device according to claim 6, wherein the first members are adapted to change polarity of the basic signal several times within the measurement time period.

10. A device according to claim 6, wherein it is adapted to detect metal objects passing the coil by detecting the magnetic field of the coil in the region of measurement.

11. A device according to claim 6, wherein the member for generating the basis signal is adapted to continuously vary the length of time of the basic signal, i.e., the length of the time of a regular repetition of the basis signal.

12. A device according to claim 6, wherein the member for generating the basic signal is adapted to continuously vary the frequency of the basic signal.

13. A method for carrying out measurements of a quantity by measuring an influence upon a magnetic field in a region of measurement in which a basic signal varying regularly with the time is generated and sent to a coil in the region of measurement for generating a magnetic field in accordance therewith, the magnetic field of the coil is detected in the region of measurement through generating a detection signal and a possible component deriving from an influence upon the magnetic field in the region of measurement associated with said quantity is separated from this detection signal for determining said quantity, wherein the polarity of the basic signal sent to the coil is changed regularly and synchronized with the length of time for a regular repetition of the basic signal, so that the coil is brought to generate a magnetic field on the basis of the basic signal so modified, an analysis of the detection signal induced in the region of measurement is controlled in synchronization with this change of polarity, and that a polarity change of the detection sign is carried out in synchronization with the polarity change of the basic signal before this analysis, in which polarity change means that the signal in question thereafter takes an opposite sign to the sign it would have had without such a change until a subsequent such change, after which it gets the same appearance as had none of the two last polarity changes taken place, so as to eliminate exterior disturbance fields.

14. A method according to claim 13, wherein the time length of the basic signal, i.e., the length of the time for a regular repetition of the basic signal, is continuously varied over the time.

15. A method according to claim 13, wherein the frequency of the basic signal is varied continuously.

16. A method according to claim 13, wherein the detection signal is influenced by polarity change inversely to the influence of the basic signal, so that components of the detection signal subjected to both these influences will have substantially the same appearance as had they not been subjected to any influence at all.

17. A method according to claim 13, wherein said polarity change is carried out several times within the measurement period of time of the analysis.

* * * * *